United States Patent
Price et al.

(10) Patent No.: US 8,423,508 B2
(45) Date of Patent: Apr. 16, 2013

(54) APPARATUS AND METHOD OF CREATING AND UTILIZING A CONTEXT

(75) Inventors: Philip K. Price, San Diego, CA (US); Ramaswamy Venkateshwaran, San Diego, CA (US); Matthew M. J. Michael, Seattle, WA (US); Gregory Burns, Seattle, WA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 12/855,583

(22) Filed: Aug. 12, 2010

(65) Prior Publication Data

US 2011/0137960 A1 Jun. 9, 2011

Related U.S. Application Data

(60) Provisional application No. 61/266,850, filed on Dec. 4, 2009.

(51) Int. Cl.
*G06F 17/00* (2006.01)

(52) U.S. Cl.
USPC .......................................... 707/621; 707/661

(58) Field of Classification Search .................. 707/741, 707/740, 621; 455/444.1
See application file for complete search history.

(56) References Cited

U.S. PATENT DOCUMENTS

| | | | |
|---|---|---|---|
| 6,748,195 B1 | 6/2004 | Phillips | |
| 2001/0011028 A1 | 8/2001 | Wendelrup | |
| 2005/0136837 A1 | 6/2005 | Nurminen | |
| 2006/0143298 A1 | 6/2006 | Anttila et al. | |
| 2006/0148528 A1 | 7/2006 | Jung et al. | |
| 2007/0198663 A1* | 8/2007 | Helander | 709/220 |
| 2008/0077865 A1 | 3/2008 | Hiles et al. | |
| 2008/0201000 A1 | 8/2008 | Heikkila et al. | |
| 2009/0089288 A1* | 4/2009 | Petersen | 707/9 |
| 2009/0327327 A1* | 12/2009 | Sathish | 707/102 |
| 2011/0014952 A1* | 1/2011 | Minton | 455/566 |

FOREIGN PATENT DOCUMENTS

| | | |
|---|---|---|
| EP | 1566952 A1 | 8/2005 |
| WO | 2004093473 A2 | 10/2004 |

OTHER PUBLICATIONS

International Search Report and Written Opinion of the International Searching Authority for PCT/US2010/052913, International Searching Authority—European Patent Office. Jan. 14, 2011.

* cited by examiner

*Primary Examiner* — Amy Ng
(74) *Attorney, Agent, or Firm* — Nicholas A. Cole

(57) ABSTRACT

An apparatus or method of context-aware communication comprises obtaining, by an access terminal, a plurality of terminal data from a plurality of access terminal subsystems, one or more terminal applications, or a combination of both. Further, the various embodiments may include determining at least one context corresponding to at least a portion of the plurality of terminal data. Also, various embodiments may include creating a context profile having a context identifier identifying each context, wherein each context profile comprises profile parameters corresponding to the respective portion of the plurality of terminal data determined to correspond to the respective context. Additionally, the aspects include storing each context profile. Optionally, other embodiments may further include monitoring for the occurrence of a context corresponding to a content profile, and performing a context action triggered by detecting the occurrence of a context.

26 Claims, 7 Drawing Sheets

APPARATUS AND METHOD OF CREATING AND UTILIZING A CONTEXT

CLAIM OF PRIORITY UNDER 35 U.S.C. §119

The present Application for Patent claims priority to Provisional Application No. 61/266,850 entitled "Apparatus And Method Of Creating And Utilizing A Context" filed Dec. 4, 2009, and assigned to the assignee hereof and hereby expressly incorporated by reference herein.

BACKGROUND

1. Field

The described aspects relate to communications, and more particularly, to apparatus and methods of creating and utilizing a context.

2. Background

The technological capabilities of wireless communications devices, also referred to as access terminals, are ever increasing. As a result, their operation can be complicated.

Thus, there is a desire for improved apparatus and methods of communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of context-aware communication comprises obtaining, by an access terminal, a plurality of terminal data from a plurality of access terminal subsystems, one or more terminal applications, or a combination of both. The method further includes determining at least one context corresponding to at least a portion of the plurality of terminal data. Also, the method includes creating a context profile having a context identifier identifying each context, wherein each context profile comprises profile parameters corresponding to the respective portion of the plurality of terminal data determined to correspond to the respective context. Additionally, the method includes storing each context profile.

In another aspect, for example, at least one processor for context-aware communication includes a first module for obtaining a plurality of terminal data from a plurality of access terminal subsystems, one or more terminal applications, or a combination of both. Further, the at least one processor includes a second module for determining at least one context corresponding to at least a portion of the plurality of terminal data. Also, the at least one processor includes a third module for creating a context profile having a context identifier identifying each context, wherein each context profile comprises profile parameters corresponding to the respective portion of the plurality of terminal data determined to correspond to the respective context. Additionally, the at least one processor includes a fourth module for storing each context profile. In a further aspect, a computer program product for context-aware communication includes comprises a computer-readable medium having one or more instructions. The one or more instructions include at least one instruction for causing a computer to obtain a plurality of terminal data from a plurality of access terminal subsystems, one or more terminal applications, or a combination of both. Further, the one or more instructions include at least one instruction for causing the computer to determine at least one context corresponding to at least a portion of the plurality of terminal data. Also, the one or more instructions include at least one instruction for causing the computer to create a context profile having a context identifier identifying each context, wherein each context profile comprises profile parameters corresponding to the respective portion of the plurality of terminal data determined to correspond to the respective context. Additionally, the one or more instructions include at least one instruction for causing the computer to store each context profile.

In another aspect, an apparatus for context-aware communication includes means for obtaining a plurality of terminal data from a plurality of access terminal subsystems, one or more terminal applications, or a combination of both. Further, the apparatus includes means for determining at least one context corresponding to at least a portion of the plurality of terminal data. Also, the apparatus includes means for creating a context profile having a context identifier identifying each context, wherein each context profile comprises profile parameters corresponding to the respective portion of the plurality of terminal data determined to correspond to the respective context. Additionally, the apparatus includes means for storing each context profile In further aspect, an access terminal for context-aware communication includes at least one module configured to: obtain a plurality of terminal data from a plurality of access terminal subsystems, one or more terminal applications, or a combination of both; determine at least one context corresponding to at least a portion of the plurality of terminal data; and create a context profile having a context identifier identifying each context, wherein each context profile comprises profile parameters corresponding to the respective portion of the plurality of terminal data determined to correspond to the respective context. Further, the apparatus includes a memory configured to store each context profile.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects include apparatus and methods of creating a context with respect to a wireless communication device, and optionally include an apparatus and method of utilizing the context. As used in this document, a "context" is a set of environmental conditions that define a particular event or scenario. In the terms of a wireless communication device, also referred to as an access terminal, the environmental conditions may be obtained or detected by one or more terminal subsystems or applications. As such, the described aspects include a context engine that is configured to create a context profile that identifies a context based on an associated set of context parameters, which may include terminal data from one or more terminal subsystems, or one or more terminal applications, or one or more user inputs, or one or more historical terminal data, or any combination thereof. Optionally, the described aspects may further include a context monitor configured to detect the occurrence of the context parameters for an identified context, and generate a notification that the context has been detected. Moreover, optionally, the context engine or an application resident on the access terminal may additionally perform a context action, triggered by the occurrence of the context.

In other words, the described apparatus and methods provide an efficient mechanism for the creation of context profiles, and may further provide for the automation of device functionality based on the detected occurrence of a given context. Accordingly, the described apparatus and methods automatically generate a context profile by drawing inferences from any one or any combination of current terminal data, historical terminal data, or a user trigger or input, but without the user having to explicitly define the parameters of the context. For example, the user just needs to input that he/she is at home, but doesn't need to specify the SID of the 3G system at their home, etc. Also, in some cases, a context may be defined even without a user input or trigger, for example, a user may not even need to say he/she is at home, as a profile creator may infer the identity of the context based on the user's historical location data correlated with time of day. Thus, the described apparatus and methods increase the ease-of-use and functionality of a wireless communication device.

Figure 1:
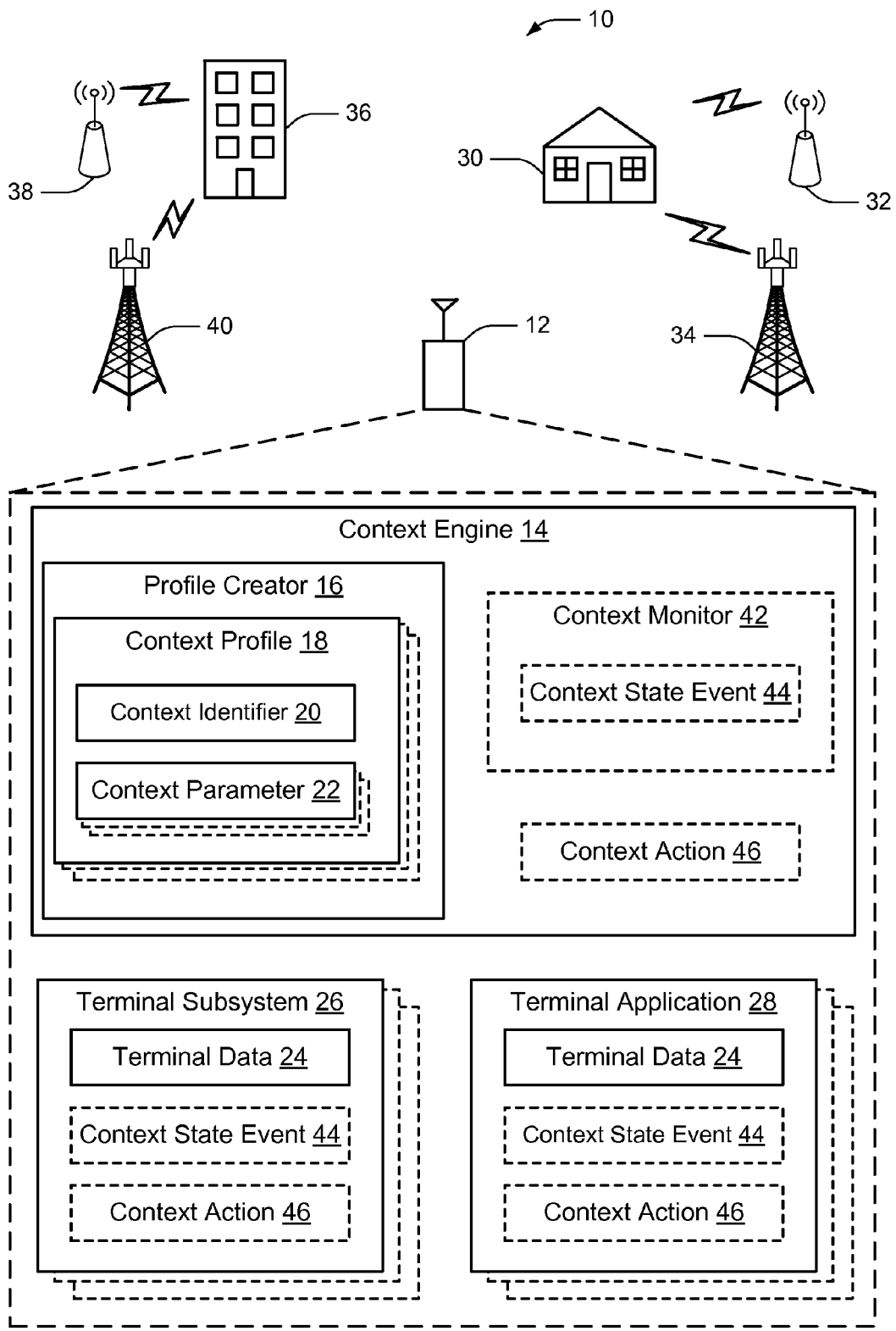
FIG. 1 is a schematic diagram of an aspect of communication system and an environment including an access terminal configured to create context profiles.

Referring to FIG. 1, in an aspect, a system 10 for creating context profiles and optionally for automating device functionality based on a context includes an access terminal 12 having a context engine 14 configured to define a context based on a given environment, optionally to further monitor for the occurrence of a defined context, and optionally to further perform actions based on a detected context.

In an aspect, context engine 14 includes a component or module having a profile creator 16 configured to generate one or more context profiles 18, wherein each context profile 18 corresponds to a different context that may be identified by a context identifier 20. In particular, each context profile 18 includes one or more context parameters 22, wherein each context parameter 22 defines an information element and corresponding value, or range of values, such that occurrence of the set of context parameters 22 in a given context profile 18 represents an occurrence of the context identified by context identifier 20.

More specifically, each context parameter 22 may include or relate to one or more terminal data 24 from one or more terminal subsystems 26, or one or more terminal applications 28, or both. For example, terminal subsystems 26 may include, but are not limited to, one or any combination of components or modules such as: a location determination subsystem, a clock subsystem, a communications subsystem, a sensor subsystem, or any other subsystem on an access terminal. Also, for example, terminal applications 28 may include, but are not limited to, one or any combination of: a phone application, a contacts application, a calendar application, a web browser application, a text messaging application, a business application, a word processing application, a multimedia application, a gaming application, or any other application on an access terminal. Further, for example, the information that defines context parameter 22 and/or terminal data 24 may include a state of one or more terminal subsystems 26, or a state of one or more terminal applications 28, or some combination of both. Moreover, as is discussed below in more detail, information from a user input or from historical terminal data may also be included in determining a context.

In other words, one or more terminal subsystems 26, or one or more terminal applications 28, or both, are operable to obtain, detect or create terminal data 24 that represents a current operating environment of access terminal 10. An operating environment, or a portion of an operating environment corresponding to a set of context parameters 22 thereby defines a context. For example, a context may be defined by combining various information from diverse sources on access terminal 12, such as application data (e.g. calendar) plus sensor data (e.g. position, acceleration pattern) plus a terminal or phone state (e.g. battery level, clock/time) plus wireless environment (e.g. WLAN SSID, 3G system SID) to create the context. As such, profile creator 16 is configured to associate a respective set of terminal data 24 into context profile 18 to define a respective context.

For example, in an aspect, a context may be related to a home 30. As such, profile creator 16 may generate context profile 18 having context identifier 20 corresponding to "home." Context parameters 22 of the "home" version of context profile 18 may include, for example, one or more of:

location information defining a specific geographic location of home 30, or range relative to the specific geographic location of home 30, such as latitude and longitude values from a position/location determination subsystem such as a Global Positioning System (GPS) subsystem, or a range relative to the latitude and longitude values;

a local area wireless communication network identifier, such as a service set identifier value (SSID) or name of an access point 32, which may be received by a communications subsystem, such as a wireless local area network (WLAN) transceiver component, in a broadcast message from access point 32 when access terminal 12 is located in a coverage area serviced by access point 32 and home 30 is located in or near the coverage area of access point 32; or a wide area wireless communication network identifier, such as a system identifier value (SID) or number of a cellular network 34, which may be received by a communications subsystem, such as a cellular transceiver component, in a broadcast or pilot message from cellular network 34 when access terminal 12 is located in a coverage area serviced by cellular network 34 and home 30 is located in or near the coverage area of cellular network 34.

In another example, a different context may be related to a workplace 36. As such, profile creator 16 may generate context profile 18 having context identifier 20 corresponding to "work." Context parameters 22 of the "work" version of context profile 18 may include, for example, one or more of:

location information defining a specific geographic location of workplace 36, or range relative to the specific geographic location of workplace 36, such as latitude and longitude values from a position/location determination subsystem such as a Global Positioning System (GPS) subsystem, or a range relative to the latitude and longitude values;

a service set identifier value (SSID) or name of an access point 38, which may be received by a communications subsystem, such as a wireless local area network (WLAN) transceiver component, in a broadcast message from access point 38 when access terminal 12 is located in a coverage area serviced by access point 38 and workplace 36 is located in or near the coverage area of access point 38;

a system identifier value (SID) or number of a cellular network 40, which may be received by a communications subsystem, such as a cellular transceiver component, in a broadcast or pilot message from cellular network 40 when access terminal 12 is located in a coverage area serviced by cellular network 40 and workplace 36 is located in or near the coverage area of cellular network 40.

Optionally, in some aspects, context engine 14 may additionally include a context monitor 42 configured to detect the occurrence of a context defined by context profile 18. For example, context monitor 42 may monitor or otherwise obtain terminal data 24 from one or more terminal subsystems 26, or one or more terminal applications 28, or both, and compare the received data with the set of context parameters 22 to determine if the corresponding context, identified by context identifier 20, has occurred or is occurring. Upon determining occurrence of a context, context monitor 42 may be further configured to generate a context state event 44 that represents the occurrence of the context. Each context state event 44 corresponds to each context profile 18, thereby indicating the respective context. Context state event 44 may include a message that indicates a given context, a state or value in a registry associated with the given context, or any other mechanism that notifies other terminal components or that is accessible to other terminal components to publicize the occurrence of the context corresponding to context profile 18.

Additionally, it should be noted that context monitor 42 may alternatively, or in addition, be located in or associated with one or more terminal subsystems 26 and/or terminal applications 28, such that an individual terminal subsystem or application may be able to detect the occurrence of a context that may have parameters primarily associated with the given subsystem or application.

Optionally, upon generation of context state event 44, one or more of context engine 14, one or more terminal subsystems 26, or one or more terminal applications 28 may perform a context action 46. Context action 46 is any action triggered by occurrence of a context, as may be represented by context state event 44.

Thus, the described aspects provide for efficient creation of a context profile, and optionally for efficient access terminal operation and functionality based on detecting the occurrence of a context associated with the context profile.

Figure 2:
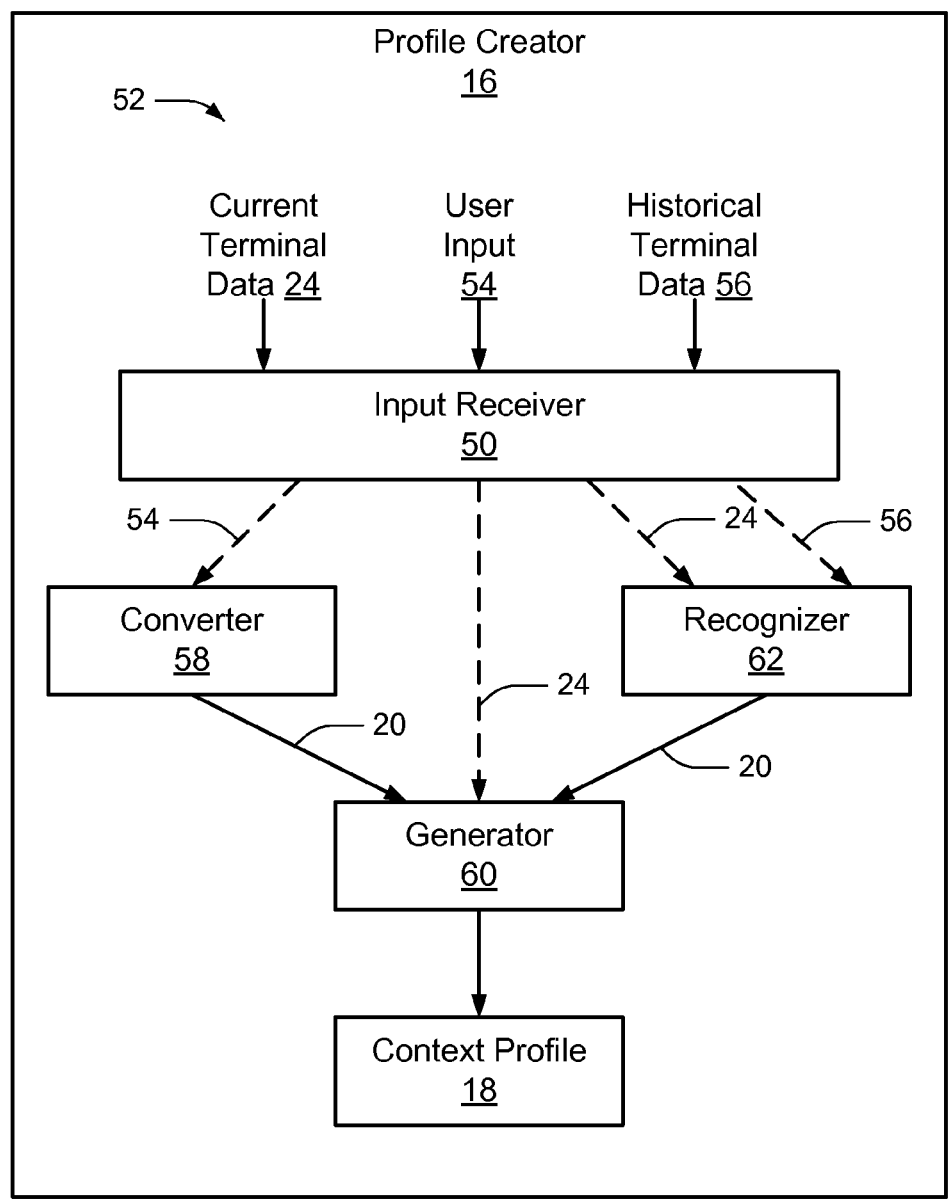
FIG. 2 is a schematic diagram of an aspect of a profile creator component of the access terminal of FIG. 1.

Referring to FIG. 2, in an aspect, profile creator 16 may include a component or module having an input receiver 50 configured to receive various inputs 52 for use in creating context profiles. For example, inputs 52 may include, but are not limited to, information such as current terminal data 24, a user input 54, historical terminal data 56, or any other information useful in determining existence of a context.

Further, profile creator 16 may include different processing components depending on the received input. For example, if input receiver 50 receives user input 54, such as voice data or alphanumeric data, then profile creator 16 may be configured to operate a converter 58 to transform user input 54 into context identifier 20. For instance, converter 58 may include a voice recognition component operable to transform spoken words into text. In another case, for instance, converter 58 may transform one or more alphabetic characters, or numeric characters, or some combination of both, into context identifier 20. Receiving user input 54 may comprise receiving a context code, wherein the context code corresponds to the context identifier 20. Further, in this example, a generator 60 receives the resulting context identifier 20 from converter 58 and associates the current set of terminal data 24 with context identifier 20 to generate context profile 18. In another example, if input receiver 50 receives terminal data 24, historical terminal data 56, or both, then profile creator 16 may be configured to operate a recognizer 62 to identify correlations between the data, or to identify repeating patterns in the data, or to otherwise analyze the data to determine a context and identify context identifier 20. For example, recognizer 62 may determine a context and may request user input 54 to obtain context identifier 20, or may match the determined set of terminal data to one of a plurality of predetermined templates defining parameter values to associate with respective ones of a plurality of predetermined context identifiers. Further, in this case, generator 60 receives the resulting context identifier 20 from recognizer 62 and associates the identified set of terminal data 24, historical terminal data 56, or a combination of both, with context identifier 20 to generate context profile 18. Additionally, profile creator 16 or any components thereof may include or execute algorithms, rules, heuristics, fuzzy logic, and any other determination mechanism to identify a context and create context profile 18.

Figure 3:
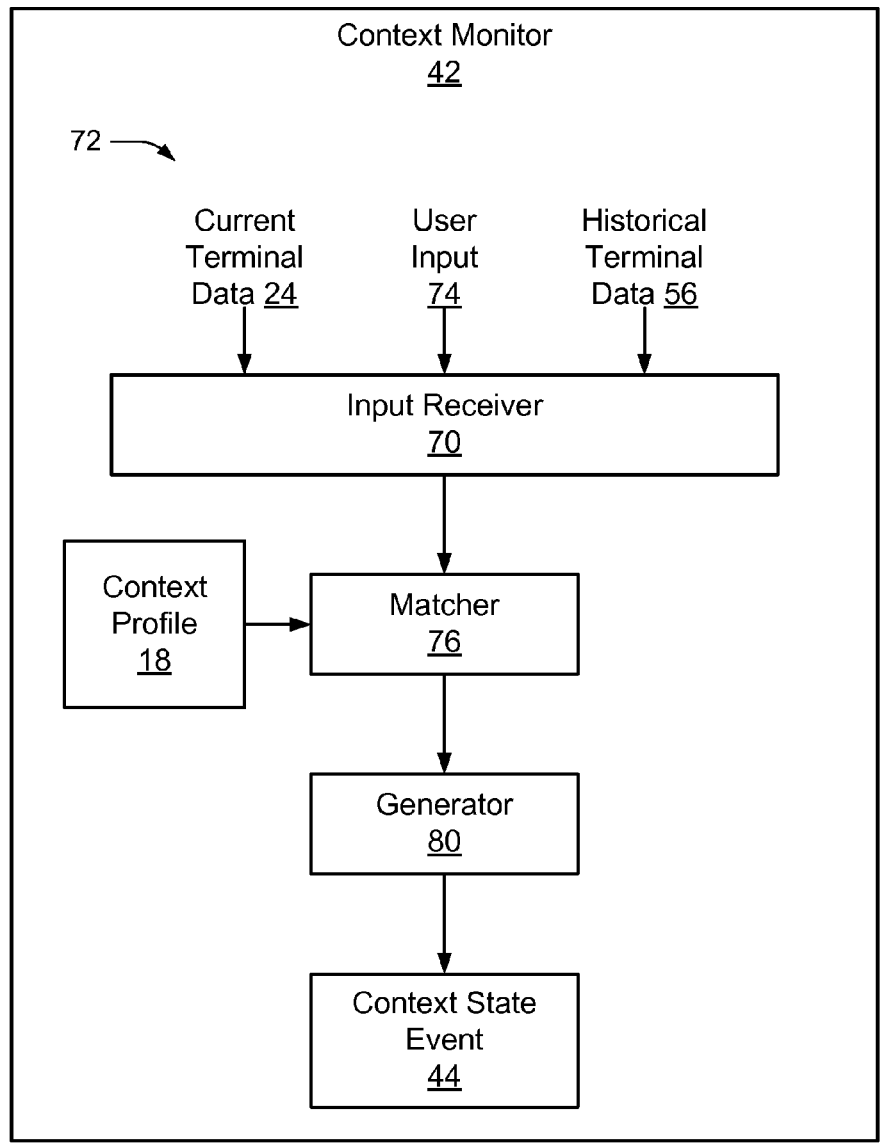
FIG. 3 is a schematic diagram of an aspect of a context monitor component of the access terminal of FIG. 1.

Referring to FIG. 3, in an aspect, context monitor 42 may include a component or module having an input receiver 70 configured to receive various inputs 72 for use in identifying the occurrence of one or more contexts corresponding to one or more context profiles 18. For example, inputs 72 may include one or any combination of current terminal data 24, or a user input 74, or historical terminal data 56. In some aspects, context monitor 42 is configured to run automatically based on receiving current terminal data 24 or historical terminal data 56 and without receiving user input 74, however, in other aspects user input 74 may be an additional received input configured to fine tune the ability of context monitor 42 to detect a context. In other words, user input 74 may comprise additional data that prompts or indicates to context monitor 42 the occurrence of a given context.

Further, context monitor 42 may include a matcher 76 configured to compare the received current terminal data 24 to the set of context parameters 22 of each context profile 18 in order to determine a match 78. If match 78 of context profile 18 is identified, then generator 80 generates context state event 44 corresponding to the matched context profile 18.

Referring back to FIG. 1, context action 46 may be any action triggered by the occurrence of a context, as triggered by the generation of context state event 44. As context action 46 may be one or more action taken by one or more of context engine 14, one or more terminal subsystems 26, or one or more applications 28, context action 46 may include any functionality or capability of access terminal 12. Further, any number of context actions 46 may occur, as a given context can be created for any number of situations or environments of use of access terminal 12.

In one example, for instance, access terminal 12 may create a context corresponding to "home," and upon detecting the "home" context one or more of the following context actions 46 may occur:

switching the communication sessions on access terminal 12 from a cellular link to an access point or WLAN link to take advantage of, for example, a lower cost or a higher bandwidth available through the access point that serves the "home" context;

automatically launching one of the terminal applications 28 to enable interaction with a corresponding application on a "home" computer that can be wirelessly contacted, now that access terminal 12 is in the "home" context, via a short range protocol, such as Bluetooth, Peanut, Zigbee, etc., wherein such interaction may include, for example, synching data, directing action in the corresponding application, such as activating or deactivating a home security system, turning on or off locally networked devices such as lights, appliances, etc.; or automatically launching one of the terminal applications 28 or activating one of the terminal subsystems 26 to perform an action associated with the "home" context, such as originating a voice call to another device associated with the "home" context, such as cellular phone of a wife if access terminal 12 corresponds to a husband.

In another example, for instance, access terminal 12 may create a context corresponding to "driving to/from home," and upon detecting the "driving to/from home" context, such as by correlating velocity or movement data from a sensor or a location determination subsystem with location data, one or more of the following context actions 46 may occur:

automatically launching one of the terminal applications 28 or activating one of the terminal subsystems 26 to perform an action associated with the "driving to/from home" context, such as launching a task list application to display or audibly present a grocery list, a reminder to stop at a store, a reminder to check the tire pressure, etc.;

switching communication sessions on access terminal 12 from a first communication network to a second communication network at a specific location, for example, based on a consistently low signal strength of the first network associated with dropped calls, as learned over time with respect to the "driving to/from home" context; or changing from among a plurality of voice messages that a caller to access terminal 12 may receive, depending on the location of access terminal 12 in the "driving to/from home" context, such as switching to a work voice message when nearing a location of workplace 36, or switching to a home voice message when nearing a location of home 30, or switching to a voice message indicating that the call cannot be answered because the user is driving, etc.

Figure 4:
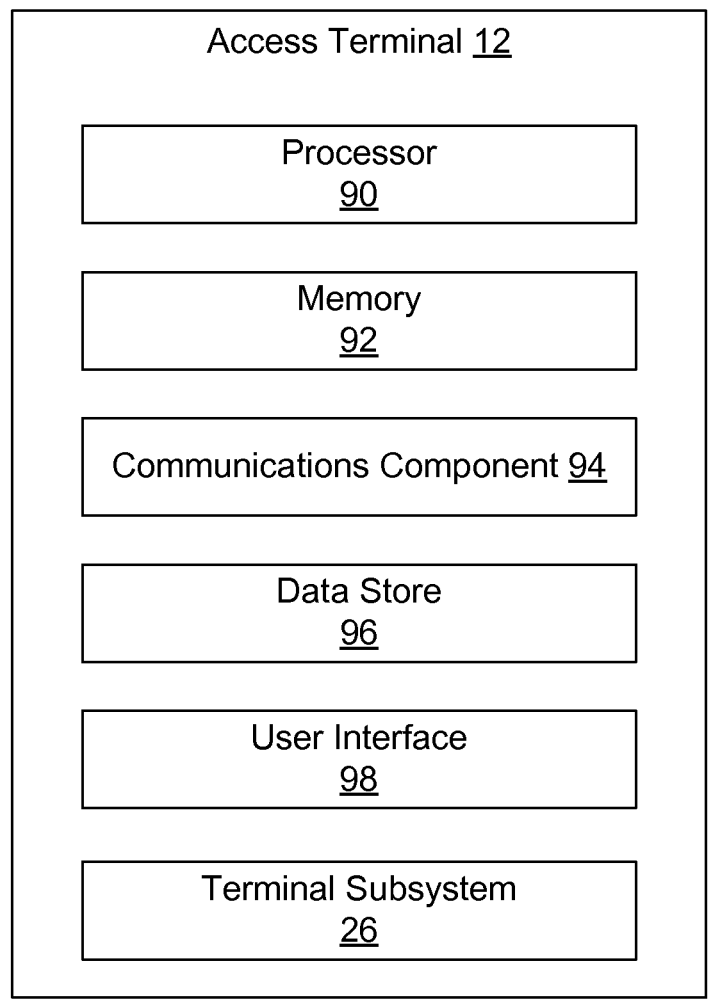
FIG. 4 is a schematic diagram of an aspect of the access terminal of FIG. 1.

Referring to FIG. 4, in one aspect, access terminal 12 includes a processor 90 for carrying out processing functions associated with one or more of the methods, components or functions described herein. For example, processor 90 can carry out one or more actions, such as obtaining terminal data, determining a context and generating a context profile, monitoring for the occurrence of a context corresponding to a context profile, generating a notice of a detected occurrence of a context corresponding to a context profile, or performing a context action triggered by the detected occurrence of a context corresponding to a context profile. Processor 90 can include a single or multiple set of processors or multi-core processors. Moreover, processor 90 can be implemented as an integrated processing system and/or a distributed processing system.

Access terminal 12 may further include a memory 92, such as for storing local versions of applications 28, codes, instructions or modules being executed by processor 90. Memory 92 can include any type of memory usable by a computer, such as random access memory (RAM), read only memory (ROM), tapes, magnetic discs, optical discs, volatile memory, non-volatile memory, and any combination thereof.

Further, access terminal 12 may include a communications component 94 that provides for establishing and maintaining communications with one or more parties utilizing hardware, software, and services as described herein. Communications component 94 may carry communications between components on access terminal 12, as well as between access terminal 12 and external devices, such as devices located across a communications network and/or devices connected to access terminal 12 by wired or wireless links. For example, access terminal 12 may include one or more buses, and may further include transmit chain components and receive chain components associated with a transmitter and receiver, respectively, or a transceiver, operable for interfacing with external devices.

Additionally, access terminal 12 may further include a data store 96, which can be any suitable combination of memory, that provides for mass storage of information, databases, and programs employed in connection with aspects described herein. For example, data store 96 may be a data repository for applications not currently being executed by processor 92.

Access terminal 12 may additionally include a user interface component 98 operable to receive inputs from a user of access terminal 12, and further operable to generate outputs for presentation to the user. User interface component 98 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 98 may include one or more output devices, including but not limited to a display, a speaker, a haptic feedback mechanism, a printer, any other mechanism capable of presenting an output to a user, or any combination thereof.

Also, as previously noted, access terminal may include one or more terminal subsystems 26. It should be noted that terminal subsystems 26 may include one or more of, or portions of, processor 90, memory 92, communications component 94, data store 96 and user interface 98.

Figure 5:
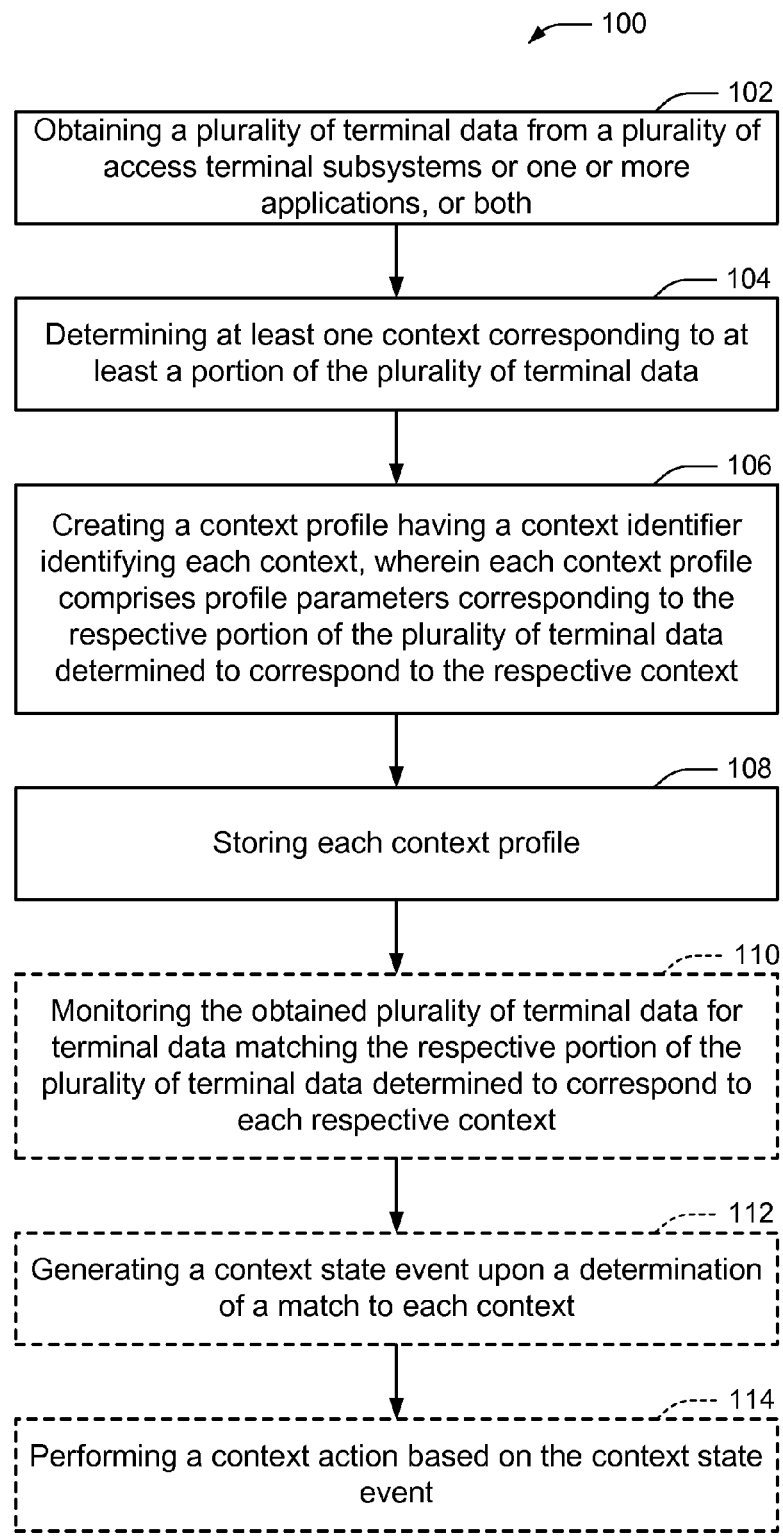
FIG. 5 is a flowchart of an aspect of a method of communication as described herein.

Referring to FIG. 5, in operation, in an aspect, a method 100 of communications comprises obtaining a plurality of terminal data from a plurality of access terminal subsystems (Block 102). For example, the terminal data may comprise data from one or more terminal subsystems and/or from one or more terminal applications.

Further, the method may include determining at least one context corresponding to at least a portion of the plurality of terminal data (Block 104). For example, the determining may identify, or receive identification of, data that define a particular context. Additional aspect of the determining are discussed below with regard to FIG. 6.

Also, the method may include creating a context profile having a context identifier identifying each context, wherein each context profile comprises profile parameters corresponding to the respective portion of the plurality of terminal data determined to correspond to the respective context (Block 106). For example, upon determining or receiving identification of a context, the method may create a respective context profile for later use in detecting the determined context.

Additionally, the method may include storing each context profile (Block 108). For example, the method may store each context profile in a memory or data store that allows each context profile to be accessed.

Optionally, in some aspects, the method may include monitoring the obtained plurality of terminal data for terminal data matching the respective portion of the plurality of terminal data determined to correspond to each respective context (Block 110). For example, the monitoring may include comparing receiving terminal data to the context parameters of each stored context and determining a match.

Optionally, in some aspects, the method may further include generating a context state event upon a determination of a match to each context (Block 112). For example, the method may include generating a state, a message, or any other publication of the existence or occurrence of the context. Further, the generating may result in the context state event being accessible to access terminal components so that such components are aware of the context.

Optionally, in some aspects, the method may further include performing a context action based on the context state event (Block 114). For example, the context action may include performing any actions, such as one or more functions based on a capability of the access terminal.

Figure 6:
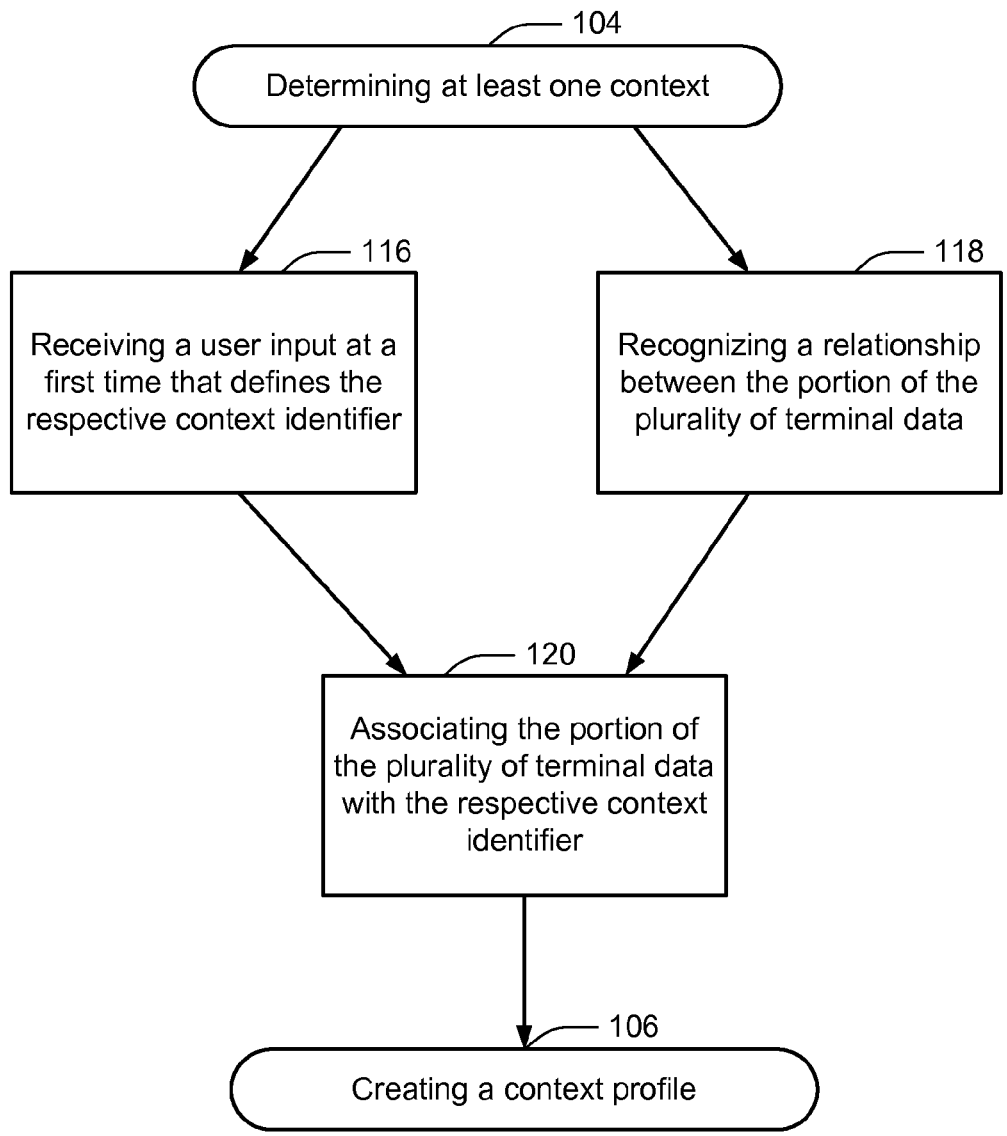
FIG. 6 is a flowchart of an aspect of a method of determining a context, relating to FIG. 5.

Referring to FIG. 6, in an aspect, the determining of the at least one context (Block 104) may include one or more actions, which may vary depending on a type of input.

For example, in an aspect, the determining of the context may further include receiving a user input at a first time that defines the respective context identifier (Block 116). For instance, the access terminal may receive a user input, such as a voice command indicating the existence of a context and identifying the context. Further, the user input corresponds to a time. As such, the determining of the context may further include associating the portion of the plurality of terminal data with the respective context identifier (Block 120), and in this case the portion of the terminal data may be all current terminal data received at the time of the user input. This aspect, allows for efficient context creation with minimal impact on the user of access terminal and provides a high degree of integrity in identifying a given context.

Alternatively or additionally, in an aspect, the determining of the context may further include recognizing a relationship between the portion of the plurality of terminal data (Block 118). For example, in this case, the input may be current and/or historical terminal data, and the method may execute automatic mechanisms, such as algorithms, rules, heuristics, fuzzy logic, etc., in order to determine relationships or patterns in the data that define one or more contexts. Further, in this case, the determining of the context may further include associating the portion of the plurality of terminal data with the respective context identifier (Block 120), wherein the portion of the data is the data determined to be related or correlated or the data that otherwise defines a context.

Thus, once the operations of FIG. 6 are performed, the method may return to FIG. 5 and the action of creating a context profile (Block 106).

Figure 7:
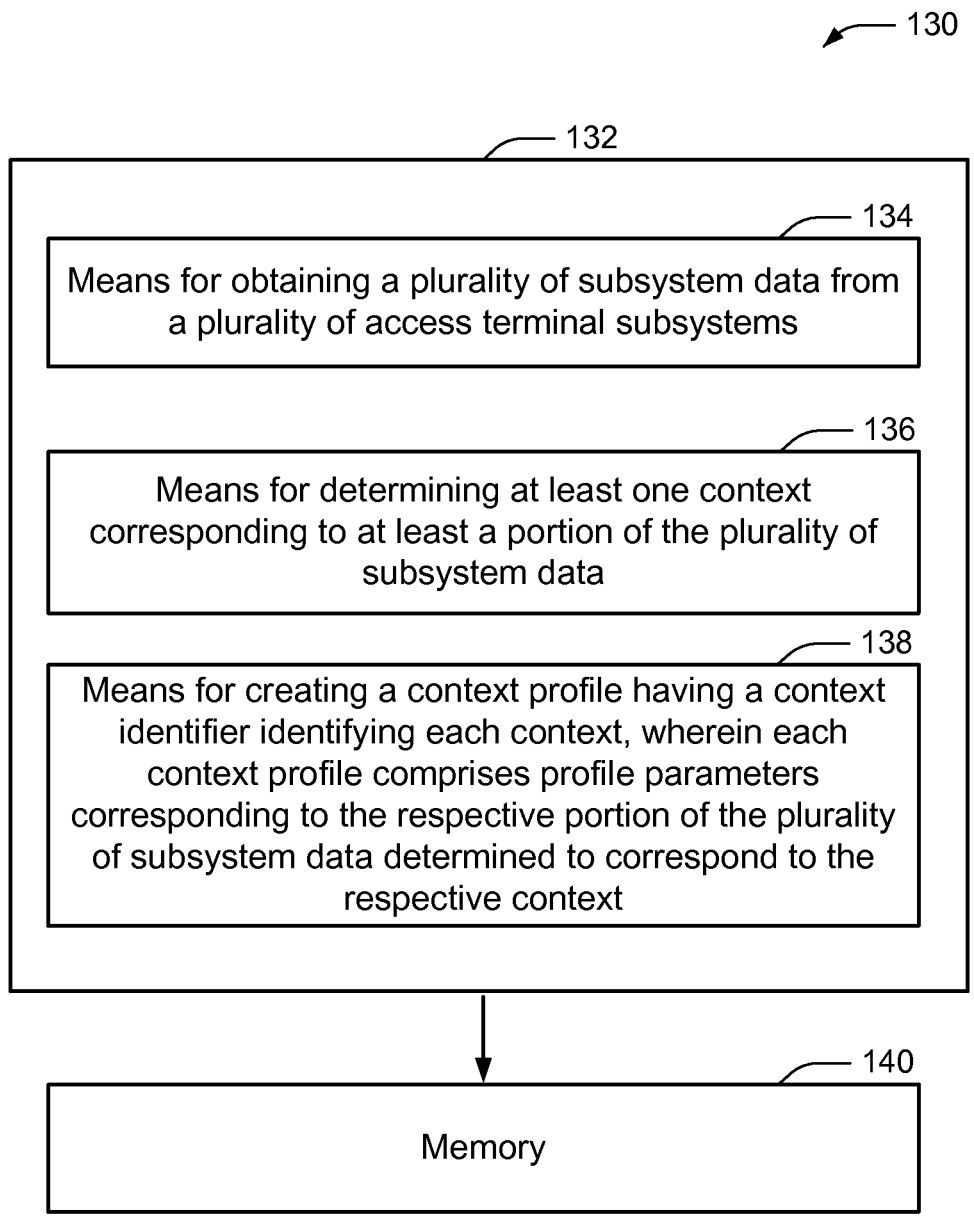
FIG. 7 is a schematic diagram of an aspect of a system of communication as described herein.

Referring to FIG. 7, in some cases, the described aspects include a system 130 for facilitating communications configured to create a context profile, and optionally may include monitoring for a context and performing an action upon detecting a context. For example, system 130 can at least partially reside within an access terminal. It is to be appreciated that system 130 is represented as including functional blocks, which can be functional blocks that represent functions implemented by a processor, software, or a combination thereof (e.g., firmware).

System 130 includes a logical grouping 132 of means that can act in conjunction. For instance, logical grouping 132 can include means for obtaining a plurality of terminal data from a plurality of access terminal subsystems (Block 134). The logical grouping 132 can also include means for determining at least one context corresponding to at least a portion of the plurality of terminal data (Block 136). Further, logical grouping 132 can include means for creating a context profile having a context identifier identifying each context, wherein each context profile comprises profile parameters corresponding to the respective portion of the plurality of terminal data determined to correspond to the respective context (Block 138). Additionally, the logical grouping 132 can include means for storing or presenting the venue-specific message.

Optionally, logical grouping 132 may include one or any combination of additional components, such as means for monitoring the obtained plurality of terminal data for terminal data matching the respective portion of the plurality of terminal data determined to correspond to each respective context, or means for generating a context state event upon a determination of a match to each context, or means for performing a context action based on the context state event.

Additionally, system 130 can include a memory 140 that retains instructions for executing functions associated with the means 134, 136 and 138. Further, memory 140 may be configured to store each context profile. While shown as being external to memory 140, it is to be understood that one or more of the means 134, 136 and 138 can exist within memory 140.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be a non-transitory storage medium, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of context-aware communication, comprising:
   obtaining, by an access terminal, a plurality of terminal data representing a current operating environment of the access terminal from a plurality of access terminal subsystems, one or more terminal applications, or a combination of both;
   storing the plurality of terminal data obtained over time in a historical database;
   determining at least one context corresponding to a portion of the plurality of terminal data by:
      receiving a user input on the access terminal at a first time that defines the respective context identifier,
      recognizing a relationship between the plurality of terminal data obtained at the first time and the plurality of terminal data in the historical database,
      identifying the portion of the plurality of terminal data corresponding to the context based on the recognized relationship, and
      associating the portion of the plurality of terminal data with the respective context identifier;
   creating a context profile having a context identifier identifying each context, wherein each context profile comprises profile parameters corresponding to the respective portion of the plurality of terminal data determined to correspond to the respective context; and
   storing each context profile.

2. The method of claim 1, wherein receiving a user input on the access terminal further comprises receiving audio data, and further comprising converting the audio data into the context identifier.

3. The method of claim 1, wherein receiving a user input on the access terminal further comprises receiving a context code, wherein the context code corresponds to the context identifier.

4. The method of claim 1, wherein recognizing the relationship further comprises correlating terminal data from a single one of the plurality of subsystems.

5. The method of claim 1, wherein recognizing the relationship further comprises correlating terminal data from two or more of the plurality of subsystems.

6. The method of claim 1, wherein the plurality of access terminal subsystems comprise a location determination subsystem, and wherein the recognizing the relationship further comprises correlating terminal data from the location determination subsystem with terminal data from other ones of the plurality of subsystems.

7. The method of claim 1, wherein the portion of the plurality of terminal data corresponding to the at least one context comprises geographic location information, a local area wireless communication network identifier, and a wide area wireless communication network identifier.

8. The method of claim 1, wherein the portion of the plurality of terminal data corresponding to the at least one context comprises application data, sensor data, a terminal state, and wireless communication environment data.

9. The method of claim 1, wherein recognizing of the relationship further comprises recognizing a repeated pattern over time in the plurality of terminal data.

10. The method of claim 1, further comprising:
    monitoring the obtained plurality of terminal data for terminal data matching the respective portion of the plurality of terminal data determined to correspond to each respective context;
    generating a context state event upon a determination of a match to each context; and
    performing a context action based on the context state event.

11. The method of claim 10, further comprising executing an application configured to perform the context action triggered by the context state event.

12. A non-transitory computer-readable medium having stored thereon computer executable instructions configured to cause a processor of an access terminal to perform context-aware communication operations comprising:
    obtaining a plurality of terminal data representing a current operating environment of the access terminal from a plurality of access terminal subsystems, one or more terminal applications, or a combination of both;
    storing the plurality of terminal data obtained over time in a historical database;
    determining at least one context corresponding to a portion of the plurality of terminal data by:
       receiving a user input on the access terminal at a first time that defines the respective context identifier,
       recognizing a relationship between the plurality of terminal data obtained at the first time and the plurality of terminal data in the historical database,
       identifying the portion of the plurality of terminal data corresponding to the context based on the recognized relationship, and
       associating the portion of the plurality of terminal data with the respective context identifier;
    creating a context profile having a context identifier identifying each context, wherein each context profile comprises profile parameters corresponding to the respective portion of the plurality of terminal data determined to correspond to the respective context; and
    storing each context profile.

13. The non-transitory computer-readable medium of claim 12, wherein the computer-executable instructions are configured to cause the processor to perform operations further comprising:
    monitoring the obtained plurality of terminal data for terminal data matching the respective portion of the plurality of terminal data determined to correspond to each respective context;
    generating a context state event upon a determination of a match to each context; and
    performing a context action based on the context state event.

14. An access terminal, comprising:
    means for obtaining a plurality of terminal data representing a current operating environment of the access terminal from a plurality of access terminal subsystems, one or more terminal applications, or a combination of both;
    means for storing the plurality of terminal data obtained over time in a historical database;
    means for determining at least one context corresponding to a portion of the plurality of terminal data, comprising:
       means for receiving a user input on the access terminal at a first time that defines the respective context identifier,
       means for recognizing a relationship between the plurality of terminal data obtained at the first time and the plurality of terminal data in the historical database,
       means for identifying the portion of the plurality of terminal data based on the recognized relationship, and
       means for associating the portion of the plurality of terminal data with the respective context identifier;
    means for creating a context profile having a context identifier identifying each context, wherein each context profile comprises profile parameters corresponding to the respective portion of the plurality of terminal data determined to correspond to the respective context; and means for storing each context profile on the access terminal.

15. The access terminal of claim 14, further comprising:

means for monitoring the obtained plurality of terminal data for terminal data matching the respective portion of the plurality of terminal data determined to correspond to each respective context;

means for generating a context state event upon a determination of a match to each context; and means for performing a context action based on the context state event.

16. An access terminal, comprising:

a memory; and at least one processor coupled to the memory, wherein the at least one processor is configured with processor-executable instructions so the access terminal performs operations comprising:

obtaining a plurality of terminal data representing a current operating environment of the access terminal from a plurality of access terminal subsystems, one or more terminal applications, or a combination of both;

storing the plurality of terminal data obtained over time in a historical database;

determining at least one context corresponding to a portion of the plurality of terminal data by:

receiving a user input on the access terminal at a first time that defines the respective context identifier, recognizing a relationship between the plurality of terminal data obtained at the first time and the plurality of terminal data in the historical database, identifying the portion of the plurality of terminal data corresponding to the context based on the recognized relationship, and associating the portion of the plurality of terminal data with the respective context identifier;

creating a context profile having a context identifier identifying each context, wherein each context profile comprises profile parameters corresponding to the respective portion of the plurality of terminal data determined to correspond to the respective context; and storing each context profile in the memory.

17. The access terminal of claim 16, wherein the user input further comprises audio data, and wherein the at least one module at least one processor is configured with processor-executable instructions to convert the audio data into the context identifier.

18. The access terminal of claim 16, wherein the user input further comprises a context code, wherein the context code corresponds to the context identifier.

19. The access terminal of claim 16, wherein the at least one processor is further configured with processor-executable instructions to recognize the relationship by correlating terminal data from a single one of the plurality of subsystems.

20. The access terminal of claim 16, wherein the at least one processor is further configured with processor-executable instructions to recognize the relationship by correlating terminal data from two or more of the plurality of subsystems.

21. The access terminal of claim 16, wherein the plurality of access terminal subsystems comprise a location determination subsystem, and wherein the at least one processor further configured with processor-executable instructions to recognize the relationship by correlating terminal data from the location determination subsystem with terminal data from other ones of the plurality of subsystems.

22. The access terminal of claim 16, wherein the portion of the plurality of terminal data corresponding to the at least one context comprises geographic location information, a local area wireless communication network identifier, and a wide area wireless communication network identifier.

23. The access terminal of claim 16, wherein the portion of the plurality of terminal data corresponding to the at least one context comprises application data, sensor data, a terminal state, and wireless communication environment data.

24. The access terminal of claim 16, wherein the at least one processor is further configured with processor-executable instructions to recognize by recognizing a repeated pattern over time in the plurality of terminal data.

25. The access terminal of claim 16, wherein the at least one processor is further configured with processor-executable instructions to:

monitor the obtained plurality of terminal data for terminal data matching the respective portion of the plurality of terminal data determined to correspond to each respective context;

generate a context state event upon a determination of a match to each context; and perform a context action based on the context state event.

26. The access terminal of claim 25, further comprising an application stored in the memory and executable to perform the context action triggered by the context state event.

* * * * *